US008654397B1

(12) United States Patent  
Bhatt et al.

(10) Patent No.: US 8,654,397 B1
(45) Date of Patent: Feb. 18, 2014

(54) METHOD AND SYSTEM FOR APPLYING PAGINATION TO A REPORT

(75) Inventors: Patanjali Bhatt, Cupertino, CA (US); Lisa S. Jorgensen, Los Gatos, CA (US); Daniel B. Steinberg, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 330 days.

(21) Appl. No.: 13/096,947

(22) Filed: Apr. 28, 2011

(51) Int. Cl.
*G06K 1/00* (2006.01)
*G06N 5/00* (2006.01)
*G06F 7/00* (2006.01)

(52) U.S. Cl.
USPC ............ 358/1.9; 358/1.13; 358/1.18; 706/46; 706/47; 706/55; 707/741; 707/748; 715/234

(58) Field of Classification Search
None
See application file for complete search history.

(56) References Cited

U.S. PATENT DOCUMENTS

| 6,844,940 | B2 * | 1/2005 | Warmus et al. ............... 358/1.18 |
| 2005/0086135 | A1 * | 4/2005 | Lu ..................................... 705/30 |
| 2005/0091585 | A1 * | 4/2005 | Parikh et al. ................... 715/517 |
| 2009/0204893 | A1 * | 8/2009 | Nguyen et al. ................. 715/251 |
| 2010/0077343 | A1 * | 3/2010 | Uhl et al. ........................ 715/787 |

* cited by examiner

*Primary Examiner* — Steven Kau
(74) *Attorney, Agent, or Firm* — Osha Liang LLP

(57) ABSTRACT

A method for applying pagination includes receiving a request to print a report spanning multiple files, gathering, in response to the request, multiple attributes for the report, and selecting, according to the attributes, multiple pagination rules. Each pagination rule includes a pagination requirement. The method further includes after receiving the request, processing each file by obtaining a document from the file, selecting a pagination rule, corresponding to the document, generating a modified version of the document by applying the pagination requirement in the pagination rule to the document, and appending the modified version of the document to the report. The method further includes dispatching the report to a printer.

33 Claims, 8 Drawing Sheets

300 Pagination Rules

| | Pagination Rule | Selection Criteria | Pagination Requirements |
|---|---|---|---|
| 302 Rule 1 | Rule 1 | Accounting Standard = US GAAP, Default Rule | Start report with number = 1; Position = center, one line below bottom margin; Page numbering type = Arabic numeral |
| 304 Rule 2 | Rule 2 | Accounting Standard = US GAAP, Document type = Cover Letter | When = No page numbering |
| 306 Rule 3 | Rule 3 | Accounting Standard = US GAAP; Document Type = Table of Contents | When = No page numbering |
| 308 Rule 4 | Rule 4 | Accounting Standard = Foreign Accounting, Default Rule | Starting number = 1; Position = center, one line below bottom margin; Page numbering type = Arabic numeral; Ignore skipped documents when continuing numbering |
| 310 Rule 5 | Rule 5 | Accounting Standard = Foreign Accounting, Document Type = Financial Report | Start each document with number = I; Page numbering type = Roman numeral; Case = upper case |
| 312 Rule 6 | Rule 6 | Accounting Standard = Foreign Accounting Document Type = List | Start each document with number = i; page numbering type = Roman numeral; Case = lower case |

*FIG. 6A*

314 Files

| | Filename | Document in File | File Type | Number of Pages |
|---|---|---|---|---|
| 316 File 1 | Bnk1CVLtr | Cover Letter for Bank 1 | Word Processing Application File | 1 pages |
| 318 File 2 | Bnk2CVLtr | Cover Letter for Bank 2 | Word Processing Application File | 1 pages |
| 320 File 3 | Idx1 | Table of Contents for Bank 1 | Word Processing Application File | 2 pages |
| 322 File 4 | Idx2 | Table of Contents for Bank 2 | Word Processing Application File | 2 pages |
| 324 File 5 | EngLtr | Engagement Letter | Word Processing Application File | 2 pages |
| 326 File 6 | BalSheet | Balance Sheet | Spreadsheet Application File | 4 pages |
| 328 File 7 | IncSheet | Income Sheet | Spreadsheet Application File | 4 pages |
| 330 File 8 | CashFl | Cash Flow Statement | Spreadsheet Application File | 4 pages |
| 332 File 9 | FixAsset | Fixed Asset List | Rasterized Image File | 30 pages |
| 334 File 10 | AcctReport | Accountant's Analysis Report | Word Processing Application File | 12 pages |

*FIG. 6B*

METHOD AND SYSTEM FOR APPLYING PAGINATION TO A REPORT

BACKGROUND

Every year millions of users (e.g., individuals, companies, and other institutions) receive, generate, and use reports from business entities. The reports provide a mechanism for the user to track and monitor the status of the business entity and make decisions regarding the status of the business entity. For example, the report may allow the user to project future growth and earnings, and appropriately allocate or reallocate finances, and provide information to co-owners and investors.

In order to generate and review a report, a user may use multiple applications. For example, a word processing application may be used to generate a cover letter, a financial application may be used to automatically track the finances of the business entity, and an image processing application may be used to create support pictures for the report. Thus, each application is a source for a document to insert into the report.

When reports are generated, reports must comply with a variety of requirements on the report. The requirements specify how the reports are presented. For example, the requirements may specify what data is to appear in the report and the particular layout of data in the report.

SUMMARY

In general, in one aspect, the invention relates to a method for applying pagination. The method includes receiving a request to print a report spanning a plurality of files, gathering, in response to the request, a plurality of attributes for the report, and selecting, according to the plurality of attributes, a plurality of pagination rules. Each pagination rule of the plurality of pagination rules includes a pagination requirement. The method further includes after receiving the request, processing each file of the plurality of files by obtaining a document from the file, selecting a pagination rule, corresponding to the document, from the plurality of pagination rules, generating a modified version of the document by applying the pagination requirement in the pagination rule to the document, and appending the modified version of the document to the report. The method further includes dispatching the report to a printer.

In general, in one aspect, the invention relates to a system for applying pagination. The system includes a computer processor, a pagination rules repository comprising a plurality of pagination rules, and an application system executing on the computer processor. The application system includes a report generation engine connected to the pagination rules repository. The report generation engine is configured to receive a request to print a report spanning a plurality of files, gather, in response to the request, a plurality of attributes for the report, and select, according to the plurality of attributes, a plurality of pagination rules. Each pagination rule of the plurality of pagination rules includes a pagination requirement. The report generation engine is further configured to, after receiving the request, process each file of the plurality of files by obtaining a document from the file, selecting a pagination rule, corresponding to the document, from the plurality of pagination rules, generating a modified version of the document by applying the pagination requirement in the pagination rule to the document, and appending the modified version of the document to the report. The report generation engine is further configured to dispatch the report to a printer.

In general, in one aspect, the invention relates to a computer readable storage medium comprising computer readable program code embodied therein for causing a computer system to receive a request to print a report spanning a plurality of files, gather, in response to the request, a plurality of attributes for the report, and select, according to the plurality of attributes, a plurality of pagination rules. Each pagination rule of the plurality of pagination rules includes a pagination requirement. The computer readable program code further causes the computer system to, after receiving the request, process each file of the plurality of files by obtaining a document from the file, selecting a pagination rule, corresponding to the document, from the plurality of pagination rules, generating a modified version of the document by applying the pagination requirement in the pagination rule to the document, and appending the modified version of the document to the report. The computer readable program code further causes the computer system to dispatch the report to a printer.

Other aspects of the invention will be apparent from the following description and the appended claims.

BRIEF DESCRIPTION OF DRAWINGS

FIGS. 6A-6B shows an example in one or more embodiments of the invention.

DETAILED DESCRIPTION

Figure 1:
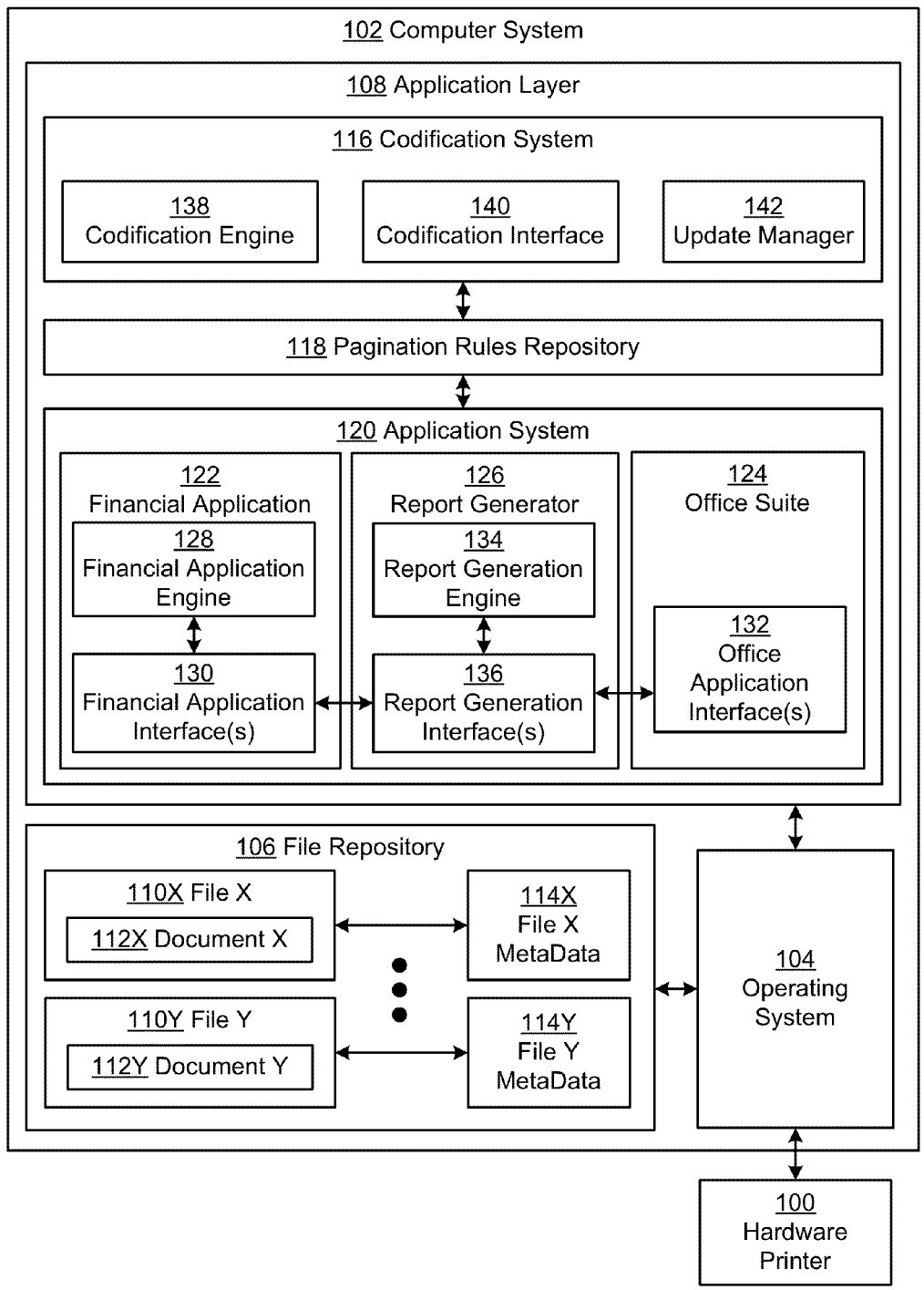
FIGS. 1-2 show schematic diagrams of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for applying pagination to a report. Specifically, when a report is requested to be printed, embodiments of the invention apply pagination rules to the different documents in the various files in the report. The pagination rules ensure that the report complies with pagination requirements applicable to the particular report. The pagination requirements specify the pagination of the report, such as a page numbering requirement (e.g., whether and what type of page number to use on each document of the report) and/or a page break requirement (e.g., when to include a page break). For example, the pagination requirements may be based on the business entity filing the report, an accounting standard with which the report must comply, and/or any other source constraining the pagination of the report.

In one or more embodiments of the invention, the pagination rules are applied after a print request is issued to print a report. Specifically, the pagination is applied to each document temporarily as part of printing the report. Thus, when another report is printed that has different pagination requirements and spans the same or an overlapping set of documents, the same or overlapping set of documents are easily updated to comply with the different pagination requirements.

FIG. 1 shows a schematic diagram of a system in accordance with one or more embodiments of the invention. As shown in FIG. 1, the system includes a hardware printer (100) and a computer system (102). Both of these components are discussed below.

In one or more embodiments of the invention, a hardware printer (100) is a hardware device that includes functionality to transform an electronic form of a report onto physical print media, such as paper, transparencies, and any other print media.

Although not shown in FIG. 1, the system may further include a software printer. A software printer corresponds to a program that includes functionality to generate a standardized formatted file that is independent of application software, hardware, and any operating system. The software printer prints one or more documents based on a request to print the document(s) to the standardized format. For example, a software printer may include functionality to interface with the operating system print interface. Specifically, an operating system print interface may trigger the software printer to generate the standardized formatted file. Alternatively, the software printer may be triggered by an interface of an application to convert one or more documents to the standardized formatted file.

In one or more embodiments of the invention, printing includes using the operating system print interface and using an interface of an application to convert a document or a set of documents to the standardized formatted file. In one or more embodiments of the invention, once printed, the standardized formatted file cannot be modified by the original program that created one or more documents in the standardized formatted file. Specifically, any modification by the original program requires a reprinting of the one or more documents. For example, the standardized formatted file may correspond to portable document format (PDF) file and the software printer may be a PDF printer and/or PDF converter.

In one or more embodiments of the invention, the computer system (102) is any type of device or collection of devices for processing instructions. For example, the computer system (102) may be or may include one or more of a laptop computer, a mobile device (e.g., personal digital assistant, smart phone, or any other small mobile devices), a server, or another other device that is configured to process instructions. Additionally, if the computer system includes multiple devices, a portion of the components shown in FIG. 1 may be performed by one device while another portion may be performed by one or more remote devices. For example, a mobile device may include a lightweight application configured to connect to a server with the one or more components of FIG. 1. The hardware of the computer system (102) is discussed below and in FIG. 7 in one or more embodiments of the invention.

Continuing with FIG. 1, the computer system (102) includes an operating system (104), a file repository (106), and an application layer (108). Each of these components are described below.

In one or more embodiments of the invention, the file repository (106) is any type of storage unit or device for storing files (e.g., file X (110X), file Y (110Y)). For example, the file repository may be one or more physical devices, a logical association of data, or any other storage unit. The file repository (106) may reside on a remote device, such as a networked file server or a "cloud"-based storage system. Alternatively or additionally, all or a portion of the file repository (106) may be on a local computer system of the user in one or more embodiments of the invention. In one or more embodiments of the invention, a file is a storage structure for storing data. Each file (e.g., file X (110X), file Y (110Y)) stores at least one document (e.g., document X (112X), document Y (112Y)). For example, a portion of the files may include a single document while other files include multiple documents. In one or more embodiments of the invention, the document (e.g., document X (112X), document Y (112Y)) is the interrelated data stored in the file. The document may be any type of interrelated data. For example, the document (e.g., document X (112X), document Y (112Y)) may be a cover letter, an image, a financial statement (e.g., income statement, balance sheet, financial transaction statement), support documentation, prospectus, governmental forms (e.g., tax forms, securities and exchange commission (SEC) forms, or any other form provided by a regulatory system), or any other type of document for inclusion in the report. Further, by way of an example, a single file, such as a spreadsheet application file, may include a separate sheet for an income statement, balance sheet, financial transaction statement, and other such documents. By way of an alternative example, the an income statement, balance sheet, financial transaction statement, and other such documents may be stored in multiple separate files.

In one or more embodiments of the invention, each document (e.g., document X (112X), document Y (112Y)) has a corresponding document length. The document length is the number of pages in the document. The number of pages may be expressed as whole pages or percentage of pages in one or more embodiments of the invention. In one or more embodiments of the invention, the document length may be stored with the document and/or calculated as part of the printing process.

In one or more embodiments of the invention, each document may have a corresponding document type. The document type is information about the contents of the document. Specifically, the document type may be defined with respect to function of the document in the report. For example, the document type may be cover letter, image, tax form 1120, prospectus, income statement, and any other information that provides information about the type of document.

Returning to the file, each file (e.g., file X (110X), file Y (110Y)) has a corresponding file metadata (e.g., file X metadata (114X), file Y metadata (114Y)). The file metadata is data about the corresponding file. For example, the file metadata may include one or more of the file size, filename, document type, file format, and other information about the file. The file format identifies the encoding of the data in the file. Specifically, the file format defines how the document in the file may be interpreted for use. In one or more embodiments of the invention, the file format is defined by the program that created the file. The file format may be specified in a filename extension appended to the filename.

Continuing with FIG. 1, the operating system (104) is software that manages an application's use of the computer system's hardware (not shown). Thus, the operating system (104) determines when and whether user-level applications in the application layer (108) can access a resource of the computer system (102). The separation by the operating system (104) between the hardware and the application layer (108) allows for stability and security in the computer system (102) and for the user-level applications in the application layer (108) to operate without requiring knowledge of the underlying hardware. In one or more embodiments of the invention, the operating system (104) includes common interfaces that are standardized regardless of the underlying hardware. The common interfaces include an interface for allowing applications to perform certain functions, such as using hardware, accessing the file repository (106), and printing one or more files.

In one or more embodiments of the invention, the operating system (104) is operatively connected to applications in the application layer (108). The application layer (108) is a logical partition of the software environment of the computer system. The application layer (108) includes a codification system (116), pagination rules repository (118), and the application system (120). Each of these is discussed below.

The codification system (116) is a program or a portion of a program for obtaining and updating pagination rules in one or more embodiments of the invention. The codification system (116) includes a codification engine (138), a codification interface (140), and an update manager (142) in one or more embodiments of the invention. The codification engine (138) includes functionality to store new pagination rules, update existing pagination rules, and remove pagination rules in the pagination rules repository (118) (discussed below).

The codification interface (140) is a user interface for interacting with a user to update the pagination rules repository (118). Specifically, the codification interface (140) may include user interface components (e.g., menus, buttons, drop down lists, etc.) to allow a user to add, remove, and modify pagination rules. Using the codification interface, a user may submit pagination requirements for a particular pagination rule and the selection criteria that retrieves the pagination rule. The selection criteria and the pagination requirement are discussed below and in FIG. 2. For example, for submitting pagination requirements, the codification interface (140) may include, for example, one or more user interface components, such as drop-down menus, selection boxes and other components, that allow the user to select the particular requirements and a particular set of selection criteria.

In one or more embodiments of the invention, the update manager (142) includes functionality to search for updates for the pagination rules repository (118). The updates may include the addition, modification, and/or removal of one or more pagination rules. Specifically, the update manager (142) may include functionality to request updates from one or more suppliers of the pagination rules (not shown). The supplier of the pagination rules may include a server of the business entity, of a governmental entity, of a vendor or creator of the codification system (116), or of another supplier. Alternatively or additionally, pagination rules may be supplied using an offline electronic transfer method, such as by electronic mail (e-mail), by physical storage media (such as disk, CD, DVD or flash drive), or any other offline electronic transfer method. The update manager (142) may be configured to obtain updates periodically, at a set time, or upon receiving a synchronization request.

In one or more embodiments of the invention, the pagination rules repository is any type of storage unit and/or device (e.g., memory structure, a file system, database, collection of tables, internet-based data service or storage server, or any other storage mechanism) for storing pagination rules (discussed below and in FIG. 2). Further, the pagination rules repository (118) may include multiple different storage units and/or devices. The multiple different storage units and/or devices may or may not be of the same type or located at the same physical site.

In one or more embodiments of the invention, an application system (120) is operatively connected to the pagination rules repository (118) and the file repository (106). In one or more embodiments of the invention, the application system (120) includes functionality to generate documents and reports. Specifically, the application system (120) is a logical grouping of applications configured to generate the documents and reports. In one or more embodiments of the invention, the application system (120) includes a financial application (122), an office suite (124), and a report generator (126). Each of these components is discussed below.

In one or more embodiments of the invention, a financial application (122) is a program configured to assist in managing the finances of the business entity. For example, the financial application (122) may include functionality to perform accounting functions (e.g., track financial transactions affecting a user's business, generate statements, etc.), inventory management functions (e.g., track purchase and selling of inventory, order new inventory, etc.), tax filing functions (e.g., generate a tax return), and/or perform other financial related functions in one or more embodiments of the invention. The financial application (122) includes a financial application engine (128) and a financial application interface (130) in one or more embodiments of the invention. The financial application engine (128) includes the logic to perform the financially related functions of the financial application (122). The financial application interface (130) includes a user interface and/or application programming interface for communicating with the user or another application. For example, in one or more embodiments of the invention, the financial application interface (130) may include a menu option that triggers the report generator (126) (discussed below).

Continuing with the application system (120) of FIG. 1, in one or more embodiments of the invention, an office suite (124) includes one or more programs for performing general business tasks. For example, the office suite (124) may include a word processing application, a spreadsheet application, a presentation application, a database application, and other such applications. In one or more embodiments of the invention, the office suite (124) includes office application interfaces (132). Specifically, each office suite application may include an interface corresponding to the application. The interface may include a graphical user interface and an application programming interface. The application programming interface may include modules for embedding engines and interfaces from external programs in the office suite application. Specifically, an embedded engine and interface is third party software that is non-native to the office suite application. For example, the embedded engine and interface may appear to a user as part of the interface and functionality of the office suite application while being from a third party and not distributed or sold with the office suite application.

Continuing with FIG. 1, a report generator (126) is operatively connected to the office suite (124) and the financial application (122). In one or more embodiments of the invention, the report generator (126) includes functionality to combine documents from various files and generated by various applications into a report. The report generator (126) further includes functionality to print a report from the multiple documents. In one or more embodiments of the invention, the report generator (126) includes a report generation engine and a report generation interface.

In one or more embodiments of the invention, the report generation interface may include functionality to present the user with multiple documents to select to submit in a report. In one or more embodiments of the invention, the report generation interface (136) may include user interface components (e.g., menu buttons, drop down boxes, input fields, and other user interface components) for receiving a user submission to order the documents of the report in a particular order, add or remove documents to the report, and to view a particular document.

The report generation engine (134) may be configured to open one or more instances of an office suite application for displaying a document in a particular file. Specifically, the report generation engine (134) may be configured to open a file in an office suite application. Further the report generation engine (134) may be configured to add documents in files as attachments to the file opened in the office suite application.

The report generator (134) may also include one or more embedded components in the office suite application. The embedded components include functionality to trigger an update of data stored by the financial application when data is changed in the document while the document is displayed in the office suite application. The embedded components may further include functionality to add metadata to the report, add or remove documents in the report, trigger a printing of the report, and perform other such functions. In one or more embodiments of the invention, the embedded components may include both backend logic and a user interface to perform the functions of the embedded components.

While FIG. 1 shows a configuration of components of the system, other configurations may be used without departing from the scope of the invention. Specifically, various components may be combined to create a single component. Moreover, the functionality performed by a single component may be performed by two or more components. For example, the codification system (116) may be a part of the report generator (126). Furthermore, the report generator (126), with or without the codification system (116), may be a part of the financial application (122).

Figure 2:
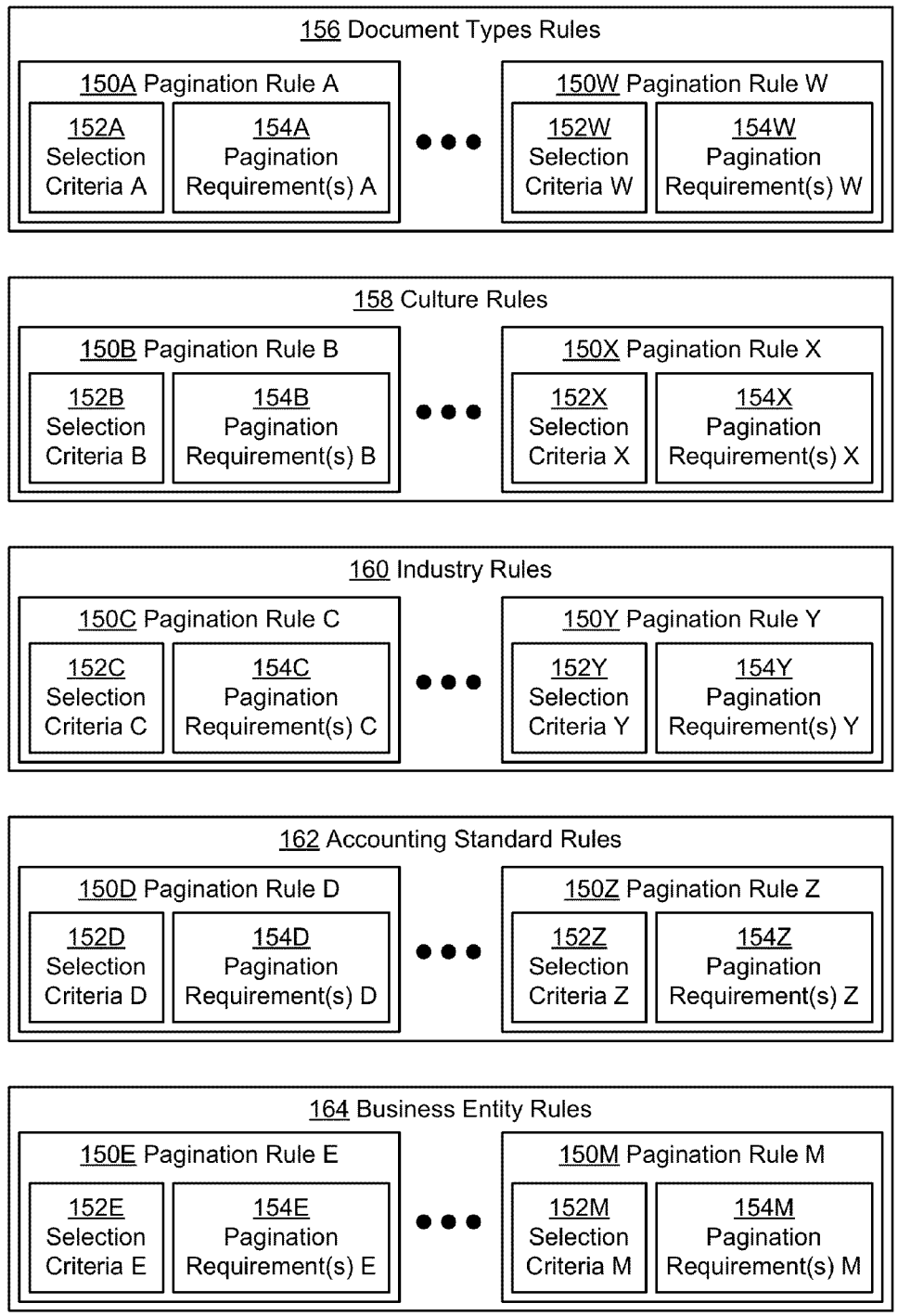

FIG. 2 shows a schematic diagram of pagination rules in the pagination rules repository in one or more embodiments of the invention. As shown in FIG. 2, each of the pagination rules (e.g., pagination rule A (150A), pagination rule W (150W), pagination rule B (150B), pagination rule X (150X), pagination rule C (150C), pagination rule Y (150Y), pagination rule D (150D), pagination rule Z (150Z), pagination rule E (150E), pagination rule M (150M)) includes selection criteria and one or more pagination requirements.

In one or more embodiments of the invention, the selection criteria (e.g., selection criteria A (152A), selection criteria W (152W), selection criteria B (152B), selection criteria X (152X), selection criteria C (152C), selection criteria Y (152Y), selection criteria D (152D), selection criteria Z (152Z), selection criteria E (152E), selection criteria M (152M)) corresponds to attributes of a report or attributes of a particular document in the report that triggers the pagination rule. Specifically, the selection criteria defines which attributes trigger the application of the pagination rule.

The attributes of the report that trigger the rule may be report attributes. For example, report attributes include the identity of the particular business filing the report, the industry of the business filing the report, the country in which the report is file, and an accounting standard with which the report must comply. Other report attributes may be used without departing from the scope of the invention.

The attributes of the document are document attributes. For example, document attributes may include the document type, the file type of a document, document length, and other attributes of a document. Other document attributes may be used without departing from the scope of the invention.

When the report attributes and/or document attributes is the same as the selection criteria, then the pagination rule is triggered. The triggering causes the pagination requirements in the pagination rule to be applied to the report or one or more documents in the report.

In one or more embodiments of the invention, the pagination requirement (e.g., pagination requirement A (154A), pagination requirement W (154W), pagination requirement B (154B), pagination requirement X (154X), pagination requirement C (154C), pagination requirement Y (154Y), pagination requirement D (154D), pagination requirement Z (154Z), pagination requirement E (154E), pagination requirement M (154M)) are requirements for the pagination of one or more documents in the report. The pagination requirements may include page numbering requirements and/or page break requirements.

In one or more embodiments of the invention, the page numbering requirements are requirements for how, whether, and where to put page numbering on the documents of the report. Specifically, the page numbering requirements specify values for page numbering properties of documents in the report. The page numbering properties include type of page number, size of page number, font of page number, position of page number with respect to the page, accent marks to display with the page number, accompanying text to display with the page number, when to display a page number, and other properties of the page number. The values of the page numbering properties are the specific values that are used. For example, for type of page numbers, the values may be capital or lower case roman numerals, Arabic numerals, and other type of numbers. For font of page number property, the value may be Courier, Times New Roman, Arial, and/or other type of fonts. The accent marks property may have a value of none, horizontal line above or below the page number, bar between the page number and accompanying text, and/or any other accent mark. The accompanying text property may have a value of none, total page count in document, total page count in the report, "p.", "pg.", "Page", and/or any other accompanying text. The "when to display page number" property may have a value of displaying the page number every page except for the first page, displaying the page number on every other page, and other such values. Other page numbering properties may exist without departing from the scope of the invention.

In one or more embodiments of the invention, the page break requirements include when to insert a page break. For example, the page break requirements may include whether a particular document should be on one or more printed pages of the report without any other documents. In particular, the page break requirement may specify whether a page break should be at the start of the document and/or whether the page break should be at the end of the document. For example, a page break requirement corresponding to selection criteria of file type is an image file (i.e., the document is an image) may specify that the image is to appear on the same page as the next document in the report.

Continuing with FIG. 2, rules may be grouped into sets of rules according to a source of the rule. A rule source is a basis for an existence of one or more rules. Specifically, the rule source may correspond to the document attributes or report attributes specified by the selection criteria in the rules. The sets of rules may include document type rules (156), culture rules (158), industry rules (160), accounting standard rules (162), and business entity rules (164) in one or more embodiments of the invention.

In one or more embodiments of the invention, document type rules (156) include pagination rules that have selection criteria that specify a particular document type. For example, one document type rule may specify that an image file does not include page numbering. Another document type rule may specify that the cover letter does not include a page number on a first page of the cover letter but does include an Arabic page number in the middle of the second page.

In one or more embodiments of the invention, culture rules (158) include pagination rules that have selection criteria specifying the culture in which the report is filed. Specifically, the culture may be defined by the country where the report is filed. The culture may further be defined by a sector of the populous within the country. For example, Canada, the United States of America, Brazil, Argentina, European Union, and India may each have a different set of pagination rules. Thus, a report that is filed in Canada may have to comply with a different set of pagination rules than a report that is filed in England.

In one or more embodiments of the invention, industry rules (160) include pagination rules that have selection criteria specifying the particular industry of a business entity. For example, the automotive industry, financial services industry, retailing industry, and healthcare industry may each have a different set of pagination rules. For example, reports from an automotive manufacturer may have to comply with the pagination rules of the automotive industry. Further, reports from a financial institution may have to comply with a different set of rules that are applicable only to the financial services industry.

In one or more embodiments of the invention, accounting standard rules (162) include pagination rules that have selection criteria specifying the accounting standard with which the report must comply. For example, Generally Accepted Accounting Principles-United States (GAAP-US), Generally Accepted Accounting Principles-United Kingdom (GAAP-UK), International Financial Reporting Standards, Chinese Accounting Standards, Generally Accepted Accounting Principles-US (GAAP) may each have a different set of accounting rules. Thus, a report that is required to comply with GAAP-US has a different set of pagination than a report spanning at least a portion of the same set of documents and is to comply with GAAP-UK.

In one or more embodiments of the invention, business entity rules (164) include pagination rules that have selection criteria specifying the business entity that is filing the report. In particular, the specific business entity filing the report may have a set of pagination rules that are specific to the business entity. For example, consider the scenario in which Jimbo's and WeEat are two restaurants. In the example, Jimbo's restaurant may have a different set of pagination rules than WeEat restaurant. For example, Jimbo's restaurant may require that page numbers are in Arial font on the upper left hand corner while WeEat restaurant requires that the page numbers are in the center in Times New Roman font with an accent bar above the page number.

Although FIG. 2 shows a grouping of pagination rules according to the type of criteria, a pagination rule in one group may include a criteria that corresponds to a different group. In particular, some groupings of pagination rules may have sub-groupings of pagination rules that specify a different set of selection criteria. For example, a particular country may have a separate set of pagination rules for each business industry. In such a scenario, a report filed for a business entity in a particular industry must comply with general industry rules that are applicable across all countries for the particular industry as well as industry rules that are specific to the particular country.

Although FIG. 2 shows each source of pagination rules as having multiple rules, one or more of the sources may have only a single rule or not have a rule. Further, the user of letters in FIG. 2 is to distinguish between the different rules. The letters do not constitute a particular ordering or numbering of rules. Further, the word "criteria" in the FIGs. and the Specification may refer to a single criterion or multiple criteria.

Figure 3:
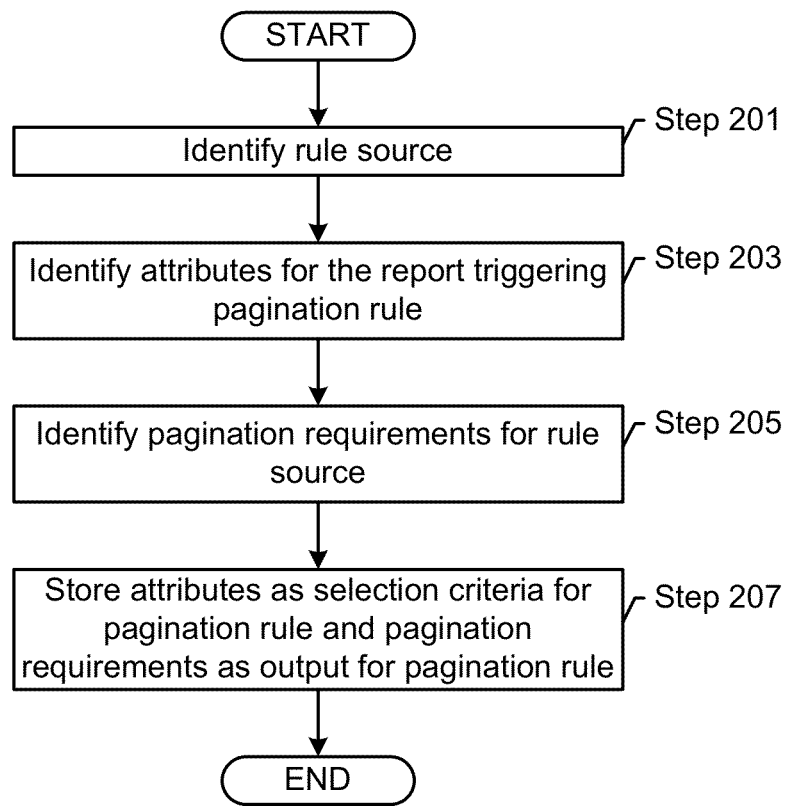
FIGS. 3-5 show flowcharts in one or more embodiments of the invention.
Figure 4:
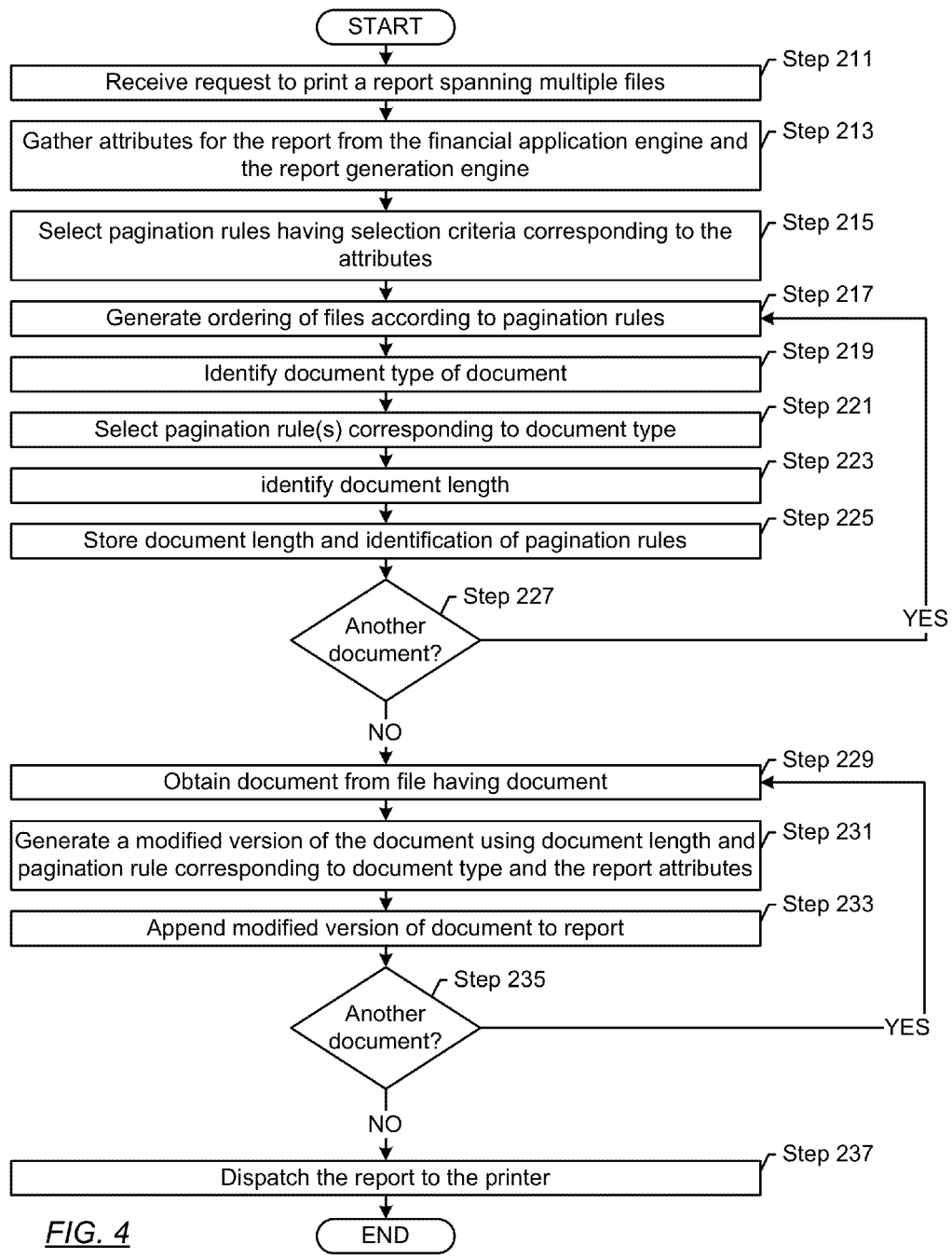
Figure 5:
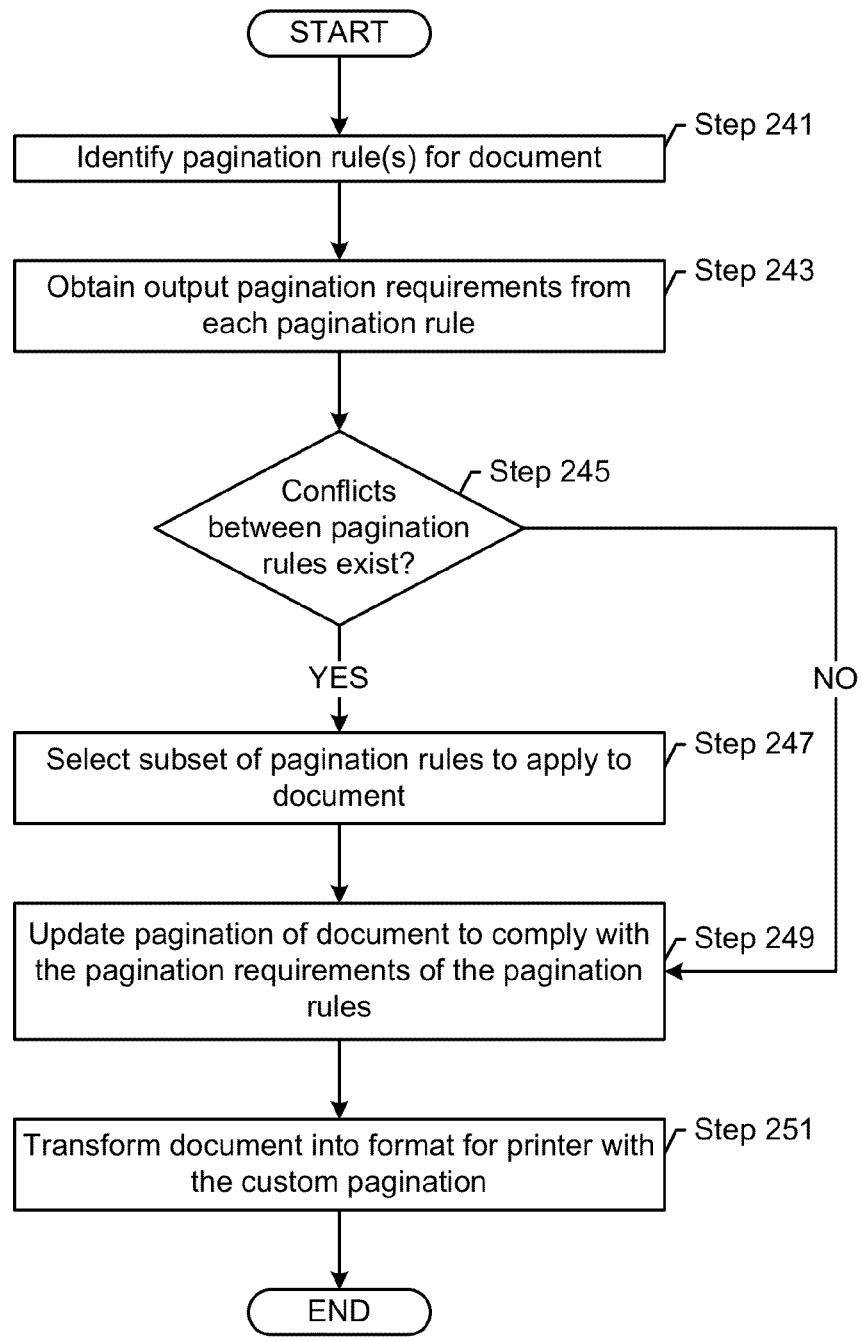

FIGS. 3-5 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Further, the steps performed in FIGS. 3-5 may be performed in whole or in part by a computer system. For example, all or a portion of the steps shown may be performed by one or more computer processors.

FIG. 3 shows a flowchart for creating pagination rules in one or more embodiments of the invention. In Step 201, a rule source is identified. As discussed above, multiple different rule sources may exist. An automated system may iterate through countries, industries, and accounting systems to identify rule sources and perform Steps 203-207 for each rule source.

Based on the rule source, report attributes that trigger a pagination rule in the rule source are identified in Step 203. Further, in Step 205, pagination requirements for the rule source are identified. An automated system may iterate through a knowledgebase for the rule source to identify report attributes that trigger a particular pagination requirement. For example, consider the scenario in which a rule source is United States. Business entities may have multiple different types of reports for filing in the United States. For example, one type of report is an annual statement that a company files with the SEC. In such a scenario, the attributes may be "an Annual statement", "SEC", and "GAAP-US". In such an example, the knowledgebase may be SEC regulations for the requirements of reports. The pagination requirements may be extracted from the knowledge.

In Step 207, the attributes are stored as selection criteria for the pagination rule and the pagination requirements as output for the pagination rule. Thus, the pagination rule is stored in the pagination repository. Steps 203-207 may be performed for each set of attributes triggering a pagination rule in the rule source.

In addition to the automated system discussed above, a user may add additional pagination rules to the pagination rule repository. For example, the user may open the codification interface and submit the report attributes and/or document attributes as the selection criteria for the new pagination rule. The user may also select the pagination requirements for the new pagination rule in the codification interface. In one or more embodiments of the invention, after the user selects the selection criteria and the pagination requirements for the pagination rule, the pagination rule is stored.

When pagination rules are stored in the pagination rules repository, the pagination rules may be applied in the generating of a report. FIG. 4 shows a flowchart for generating a report in one or more embodiments of the invention.

In Step 211, a request is received to print a report spanning multiple files in one or more embodiments of the invention. In one or more embodiments of the invention, the user may request using a report generation engine to start generating the report. In response, the report generation engine may open one or more files that have the documents for the report in one or more office suite applications. Additionally or alternatively, the report generation engine may generate all or a portion of the documents for the report. For example, the report generation engine may generate an income statement from the data in the financial application and open the income statement in a spreadsheet program. The report generation engine may add documents to the report by adding the documents in the original files as attachments to an opened document. In such a scenario, each document remains in a separate file. Further, the file with the opened document is modified to include a reference to the separate files.

When a document is opened in an office suite application, the user may view the document. Alternatively or additionally, the document(s) may be opened in the financial application. In one or more embodiments of the invention, at this stage, the documents do not have page numbering. Thus, if the same document is in multiple different reports, then the page number is not modified but only added as part of printing the report.

Before generating the report, or while the user is viewing an opened document, the user may select user interface component in the report generation engine to print a report. For example, the user may use an operating system print interface to print the report. Alternatively or additionally, the user may request the report generation engine to convert the report to a standardized formatted file. The printing of the report combines the multiple files that the report spans into a single document. In the request to print the report, the user may specify additional report attributes for printing the report. At this stage, the request to print the report triggers applying pagination rules to the report.

In Step 213, report attributes are gathered in one or more embodiments of the invention. A portion of the report attributes may be gathered from the financial application engine in one or more embodiments of the invention. For example, the report attributes gathered from the financial application engine may include the accounting standard used, the business entity, the industry of the business entity, and other such attributes. In one or more embodiments of the invention, the report attributes may be gathered directly or indirectly. To gather the report attributes directly, the report generation engine may issue a request for the report attributes to the financial application engine using an API of the financial application engine in one or more embodiments of the invention. To gather the report attributes indirectly, the report generation engine may obtain the report attributes from a storage repository of the financial application engine for the business entity in one or more embodiments of the invention. Other methods for obtaining the report attributes may be used without departing from the scope of the invention.

The report generation engine may also be pre-configured with report attributes or directly obtain report attributes from a user. For example, the report generation engine may present the user with a user interface that has fields for the type of report, which files are to be included in the report, the country in which the report is to be filed, a governmental agency receiving the report, and other such report attributes. Upon submission by the user, the report generation engine stores the report attributes for use in generating the report in one or more embodiments of the invention. Alternatively or additionally, the report generation engine may be preconfigured with default values for the any of the above. Alternatively or additionally, upon a user selection of the type of report, the report generation engine may automatically select the files having documents to include in the report.

Continuing with FIG. 4, in Step 215, pagination rules having selection criteria corresponding to the attributes are selected in one or more embodiments of the invention. Specifically, the pagination repository is accessed with the report attributes. Pagination rules having the selection criteria that are the same as the report attributes are identified.

In Step 217, an ordering of the files is generated according to the pagination rules in one or more embodiments of the invention. In one or more embodiments of the invention, one or more pagination rules may specify the order of documents in the report. For example, the pagination rule may specify that the cover letter is first, followed by a prospectus, which is followed by an income statement. In such a scenario, from the pagination rule, the order of each document is identified. Next, the file having the document is identified and the order is applied to the file. In one or more embodiments of the invention, the ordering defines the order at which files are processed.

In one or more embodiments of the invention, processing files and printing the report is performed in a two pass solution. In the first pass, information about each document and pagination rules specific to each document is identified. In a second pass, the printable version of the document with the pagination is created and appended to the report. The discussion below presents the two pass solution. Although the below discussion shows a two pass solution, the processing may be performed in a single pass in one or more embodiments of the invention. In the single pass, pagination rules are identified, page numbering is added to the document, and the document is formatted for the printer in a single pass in one or more embodiments of the invention.

In the first pass, a document to include in the report is identified (not shown). In Step 219, a document type of the document in a file is identified in one or more embodiments of the invention. The document type of the file may be obtained from the file metadata. For example, the document type may be identified from the file extension, the file name, the storage of the document type in the file metadata, and/or the description.

In Step 221, pagination rules corresponding to the document type are selected in one or more embodiments of the invention. Similar to obtaining pagination rules corresponding to the report, the pagination rules that have attributes specifying the document type are identified.

In Step 223, the document length is identified in one or more embodiments of the invention. The document length may be determined by identifying the number of pages that the document requires during printing. The document length may be set by printing preferences in the particular application (e.g., office suite application, financial application) that opens the document. For example, the printing preferences may specify that the document is to be printed on a specified number of pages, be printed at a certain percentage of the actual document size. The document length may also be set according to the actual number of pages required to print the document when printed at one hundred percent of the document's size. By identifying the document length for each document of the report, pagination requirements that require a total page count on each page can be satisfied. Furthermore, the starting page number for subsequent documents may be identified.

In Step 225, the document length and identification of the pagination rules is stored. In one or more embodiments of the invention, the identified pagination rules include pagination rules that are particular to the document and pagination rules for the report. In one or more embodiments of the invention, the document length and the pagination rules may be stored in a temporary data structure for use during printing.

In Step 227, a determination is made whether another document exists in the report in one or more embodiments of the invention. Specifically, a determination is made whether another document exists that is not yet processed during the first pass. If another document exists in the report, then Steps 219-225 are performed for the next document in the report.

Continuing with FIG. 4, Steps 229-235 present a second pass of the two pass solution in one or more embodiments of the invention. In Step 229, a document is identified from a file having the document in one or more embodiments of the invention. Specifically, the file having the document is identified.

In Step 231, a modified version of the document is generated using the document length and the pagination rules corresponding to the document type and the report attributes in one or more embodiments of the invention. The generated modified version of the document includes custom pagination for the report. By adding customization during final printing of the report rather than at design time for each document, a new report may be generated in a second printing that includes at least some of the same documents as in the first report but with different pagination.

In one or more embodiments of the invention, the modified version of the document that is generated is in a format that a hardware or software printer can directly interpret and print. For example, whereas the previous version of the document is in the format of the file type having the document, the modified version of the document may be a postscript formatted document. In one or more embodiments of the invention, generating the modified version of the document is performed using the method discussed below and in FIG. 5.

In Step 233, the modified version of the document is appended to the report in one or more embodiments of the invention. Specifically, the modified version of the document is added to modified versions of preceding documents in the report. In one or more embodiments of the invention, at this stage, the report is temporarily stored while each document is added to the report.

In Step 235, a determination is made whether another document exists in one or more embodiments of the invention. If another document exists that has not yet been processed in the second pass, then the next document is processed starting with Step 229. In one or more embodiments of the invention, once all documents are processed, the report includes modified versions for each of the documents in the report.

Continuing with FIG. 4, if another document does not exist, then in Step 237, the report is dispatched to the printer in one or more embodiments of the invention. In one or more embodiments of the invention, dispatching the report to the printer may include the operating system sending the report via the printer driver to the hardware printer. In one or more embodiments of the invention, the report with the customized pagination is printed on physical print media. Alternatively or additionally, the report with the customized pagination is stored as a single file in a standardized file format. In one or more embodiments of the invention, if the report with the customized pagination is stored as a single file, the pagination of the report cannot be modified without a user manually overlaying a new page number over the previous page number page by page on the report.

In one or more embodiments of the invention, once the user submits the request to print the report, the user does not provide additional input for the pagination of the report. In particular, in one or more embodiments of the invention, the pagination is added to the documents of the report without requiring user input.

FIG. 5 shows a flowchart for generating a modified version of the document in one or more embodiments of the invention. In one or more embodiments of the invention, in Step 241, pagination rules applicable to the document are identified in one or more embodiments of the invention. For example, the identified pagination rule may be selected from the temporarily stored pagination rules that were stored in Step 225 of FIG. 4. Rather than having separate steps for identifying the pagination rules for document attributes, pagination rules for the report attributes, and storing the identified pagination rules in temporary storage to be retrieved in Step 241, the pagination rules may be identified once and applied immediately without using temporary storage in one or more embodiments of the invention.

Continuing with FIG. 5, in Step 243, pagination requirements are obtained from the pagination rules in one or more embodiments of the invention. The obtained pagination requirements may include whether and what type of page numbering to apply to the document and whether to insert a page break before or after the document and any other relevant information.

In Step 245, a determination is made whether a conflict exists between the pagination rules. In one or more embodiments of the invention, a conflict exists when the pagination requirements have overlapping and conflicting requirements for the pagination of the document. For example, a conflict may be with regards to one pagination rule indicating that a page number should be applied to the document while another pagination rule specifies not to apply a page number to the document. By way of another example, one pagination rule may specify using Arabic numerals while another pagination rule may have an output pagination requirement of using roman numerals.

Determining whether a conflict exists may be performed by comparing the page numbering properties in the pagination requirements of the pagination rules. If different pagination requirements specify the same page numbering property, then the values of the page numbering property are compared. If the different pagination requirements specify different values for the same page numbering property, then a conflict is determined to exist. If a conflict is determined to exist, then the method proceeds to Step 247 to perform a conflict resolution process. If a conflict is not determined to exist, then the method proceeds to Step 249 to apply the pagination rules to the document.

Continuing with FIG. 5, in Step 247, a subset of the pagination rules to apply to the document is selected based on the determination that a conflict exists. In one or more embodiments of the invention, the non-selected pagination rules are ignored. Determining which pagination rule to apply may be performed by obtaining a priority designation in the pagination rule and/or inferring the selected pagination rules. For example, the priority designation may be that the pagination rule is a default rule to be used if another pagination rule does not apply. The priority designation may alternatively specify that the pagination rule is a controlling rule to apply regardless of other pagination rules. In the example, when the conflict exists between a first pagination rule having a priority designation of a default rule and any other pagination rule, then the first pagination rule is ignored and the other pagination is selected. Continuing with the example, when the conflict exists between a first pagination rule having a priority designation of a controlling rule and any other pagination rule, then the first pagination rule is selected and the other pagination is ignored.

As discussed above, selecting the pagination rules to apply may also be inferred. Specifically, pagination rules with selection criteria that are more specific to the document may be selected over general pagination rules. For example, if a conflict exists between a pagination rule that has selection criteria specifying the document type and a pagination rule that has selection criteria specifying the report type, the pagination rule specifying the document type controls because it is more specific to the particular document in the report.

For example, consider the scenario in which the document is an image and the report is a prospectus. A pagination rule for the prospectus may specify that the page property corresponding to when to include a page number has a value of every page. A pagination rule for the image may specify may specify that the page property for when to include a page number has a value of none. Because both pagination rules have a value for the same page numbering property, the values are compared, and a determination is made that the conflict exists. Because the pagination rule for the image has more specific selection criteria than the pagination rule for the report, the pagination rule for the image is selected and pagination rule for the report is ignored.

In Step 249, the pagination of the document is updated to comply with the pagination requirements of the pagination rule in one or more embodiments of the invention. Specifically, page numbering and page breaks are added to the document in conformance with the selected pagination rules.

In Step 251, the document is transformed into a format for the printer with the custom pagination added in one or more embodiments of the invention. In one or more embodiments of the invention, transforming the document is performed in accordance with standard printing practices for printing documents.

Although FIG. 5 shows Step 249 as being performed before Step 251, Step 249 may be performed after Step 251. Specifically, the page numbering may be added to the transformed document. Alternatively, Steps 249 and 251 may be performed at the same time. In such a scenario, while the document is being transformed, the page numbering may be added to the document.

In one or more embodiments of the invention, FIGS. 4 and 5 may be repeated to print another report spanning the documents of the first report, but with different pagination applied. Specifically, even though a second report includes the same or an overlapping set of documents as the first report, the documents of the second report may have a different set of page numbering and page breaks than the first report because the pagination is performed temporarily as part of the printing. Thus, FIGS. 4 and 5 may be performed to generate the second report with new custom pagination without requiring any alteration of the documents or files having the documents.

FIGS. 6A-6B shows an example in one or more embodiments of the invention. The following example is for explanatory purposes only and not intended to limit the scope of the invention. In the following example, consider the scenario in which a user is preparing two reports that have overlapping set of documents. The first report is to be filed with a local bank and is to comply with US GAAP while the second report is to be filed with a foreign bank and is to comply with the foreign bank's requirements. In the example, the first report is to include a cover letter for the first bank, a table of contents for the first bank, an engagement letter, a balance sheet, an income statement, a fixed asset list, and an accountant's analysis report. The second report is to include a cover letter for the second bank, a table of contents for the second bank, the engagement letter, the balance sheet, the income statement, a cash flow statement, the fixed asset list, and the accountant's analysis report. Because of the different pagination requirements and the slight variation of the documents, the page numbering is different for the two reports.

FIG. 6A shows example pagination rules (300) for the example in one or more embodiments of the invention. As shown in FIG. 6A, each rule has a selection criteria and pagination requirements. The selection criteria specify when the pagination rule is applicable. The pagination requirements specify the type of page numbering to apply. Below is a discussion of each pagination rule in the example.

Rule 1 (302) has selection criteria specifying rule 1 is a default rule that is applicable when the accounting standard is US GAAP. The pagination requirements for rule 1 specify that the report starts with the number one, the position of the number is centered, one line below the bottom margin, and the page numbering type is Arabic numeral.

Rule 2 (304) has selection criteria specifying that Rule 2 is applicable when the accounting standard is US GAAP and the document type is cover letter. The pagination requirements for rule 2 specifies that the document does not have any page numbers.

Rule 3 (306) has selection criteria specifying that Rule 3 is applicable when the accounting standard is US GAAP and the document type is table of contents. The pagination requirements for rule 3 specify that the document does not have any page numbers.

Continuing with the example, Rule 4 (308) has selection criteria specifying Rule 4 is a default rule that is applicable when the accounting standard is foreign accounting. The pagination requirements for rule 4 specify that the report starts with the number one, the position of the number is centered, one line below the bottom margin, the page numbering type is Arabic numeral, and skipped documents are ignored when continuing numbering passed skipped documents.

Rule 5 (310) has selection criteria specifying that rule 5 is applicable when the accounting standard is foreign accounting and the document type is financial report. The pagination requirements for rule 5 specify that the document starts with the Roman numeral I, the page numbering type is Roman numeral, and the number is in upper case.

Rule 6 (312) has selection criteria specifying that rule 6 is applicable when the accounting standard is foreign accounting and the document type is a list. The pagination requirements for rule 3 specifies that the document starts with the Roman numeral i, the page numbering type is Roman numeral, and the number is in lower case.

Continuing with the example, FIG. 6B shows an example set of files (314) to include in the reports. As shown by the file types of the documents in FIG. 6B, a variety of applications may be used to create the document. After completing creation of the documents, the user accesses the report generation engine and requests that a report is printed. Specifically, the user requests that a report is printed for Bank 1. In response, the report generation engine may present a list of documents or file names that the user may select to include in the report. Alternatively, the report generation engine may present a suggested list of filenames of documents to print from which the user may add or remove documents.

In the example, to print the first report, the user selects file 1 (316) having the cover letter for the first bank, file 3 (320) having a table of contents for the first bank, file 5 (324) having an engagement letter, file 6 (326) having a balance sheet, file 7 (328) having an income statement, file 9 (332) having a fixed asset list, and file 10 (334) having an accountant's analysis report.

In response to the user requesting to print the report and receiving confirmation of the files in the report, the report generation engine prints the report. Specifically, the report generation engine may iterate through the documents and apply the pagination rules applicable to the documents. To print the cover letter, the report generation engine determines that rule 1 (302 in FIG. 6A) and rule 2 (304 in FIG. 6A) have selection criteria matching the US GAAP report cover letter. However, because rule 1 and rule 2 are in conflict and rule 1 (302 in FIG. 6A) is a default rule, rule 1 is ignored. Accordingly, the cover letter in file 1 (316) is transformed into a modified version of the cover letter without page numbering. The modified version of the cover letter is appended to the first report. Specifically, the modified version of the cover letter is stored as the first document of the first report.

To print the table of contents, the report generation engine determines that rule 1 (302 in FIG. 6A) and rule 3 (306 in FIG. 6A) have selection criteria matching the US GAAP table of contents. However, because rule 1 and rule 3 are in conflict and rule 1 (302 in FIG. 6A) is a default rule, rule 1 is ignored. Accordingly, the table of contents in file 3 (320) is transformed into a modified version of the table of contents without page numbering. The modified version of the table of contents without page numbering is appended to the first report after the modified version of the cover letter.

For the remaining documents in the first report, the report generation engine performs a similar analysis and transformation. However, because only rule 1 (302 in FIG. 6A) applies, each of the remaining documents get the page numbering specified in rule 1. The page numbering for each remaining document in the first report is an Arabic number in the center of the document, one line below the bottom margin. More specifically, the pages of the engagement letter in file 5 (324) are numbered 4-5, the pages of the balance sheet in file 6 (326) are numbered 6-9, the pages of the income statement in file 7 (328) are numbered 10-13, the pages of the fixed asset list in file 9 (332) are numbered 14-43, and the pages of the accountant's analysis report in file 10 (334) are numbered 44-55. As each modified version of a document is created, the modified version is appended to the first report after the previous document.

Because the page numbering is performed during the print process, the application of the page number is transparent to the user. Specifically, from the user perspective, the user request to print a report and the output physical print media pages or portable document formatted (pdf) document has the required page numbering for submitting to bank 1. Further, because the numbering is not applied within each file, the user may easily request printing another report spanning the same files with different pagination requirements.

Continuing with the example, after submitting the first print request, the user submits a second print request to print the second report for the second bank. To print the second report, the user selects file 2 (318) having a cover letter for the second bank, file 4 (322) having a table of contents for the second bank, file 5 (324) having the engagement letter, file 6 (326) having the balance sheet, file 7 (328) having the income statement, file 8 (330) having a cash flow statement, file 9 (332) having the fixed asset list, and file 10 (334) having the accountant's analysis report.

In response to the user requesting to print the report and receiving confirmation of the files in the report, the report generation engine prints the second report. Specifically, the report generation engine may iterate through the documents and apply the pagination rules applicable to the documents. To print the cover letter, the table of contents, and the engagement letter, the report generation engine determines that rule 4 (308 in FIG. 6A) is the only rule applicable. Accordingly, when the report generation engine prints each of the cover letter, the table of contents, and the engagement letter, the report generation engine numbers the pages of the documents with an Arabic number in the center of the document one line below the bottom margin. More specifically, the page of the cover letter in file 2 (318) is numbered 1, the pages of the table of contents in file 4 (322) are numbered 2-3, and the pages of the engagement letter in file 5 (324) are numbered 4-5. Modified versions of each of the above documents are created with the requisite page numbering and appended to the second report.

Continuing with the example, because the balance sheet, income sheet, and cash flow statement are financial reports, report generation engine determines that rule 4 (308 in FIG. 6A) and rule 5 (310 in FIG. 6A) have selection criteria matching the foreign accounting financial reports. However, because rule 4 and rule 5 conflict and rule 4 (308 in FIG. 6A) is a default rule, rule 4 is ignored to the extent that rule 4 conflicts with rule 5. Specifically, the position of the page number of rule 4 may be maintained because rule 5 does not specify a position for the page number in one or more embodiments of the invention. Accordingly, when the report generation engine prints each of the balance sheet, income sheet, and cash flow statement, the report generation engine numbers the pages of the documents with a capital roman numeral in the center of the document one line below the bottom margin. More specifically, the pages of the balance sheet in file 6 (326) are numbered I-IV, the pages of the income statement in file 7 (330) are numbered I-IV, and the pages of the cash flow statement in file 8 (332) are numbered I-IV. Modified versions of each of the above documents are created with the requisite page numbering and appended to the second report after the previously appended modified document.

Continuing with the example, because the fixed asset list is a list, the report generation engine determines that rule 4 (308 in FIG. 6A) and rule 6 (312 in FIG. 6A) have selection criteria matching the foreign accounting lists. However, because rule 4 and rule 6 conflict and rule 4 (308 in FIG. 6A) is a default rule, rule 4 is ignored to the extent that rule 4 conflicts with rule 6. Specifically, the position of the page number of rule 4 may be maintained because rule 6 does not specify a position for the page number in one or more embodiments of the invention. Accordingly, the pages of the fixed asset list in file 9 (332) are numbered i-xxx in the center position, one line below the bottom margin. Thus, the fixed asset list is transformed and appended to the report with the page numbers.

Finally, to add the accountant's analysis report, the report generation engine determines that rule 4 (308 in FIG. 6A) is the only rule applicable. Accordingly, when the report generation engine prints the accountant's analysis report with pages numbered 6-17 in an Arabic number in the center of the document, one line below the bottom margin. The transformed accountants analysis report is appended to the second report.

As shown in the example above, to the user the pagination appears automatically. The user does not need to renumber the pages of documents when a file is removed from the report or when a page of another file is removed from the report. Furthermore, the page number for each report is specific to the requirements of the report. Thus, if the report requirements change, such as the accounting standard to use, then the page numbering across all documents is updated.

Figure 7:
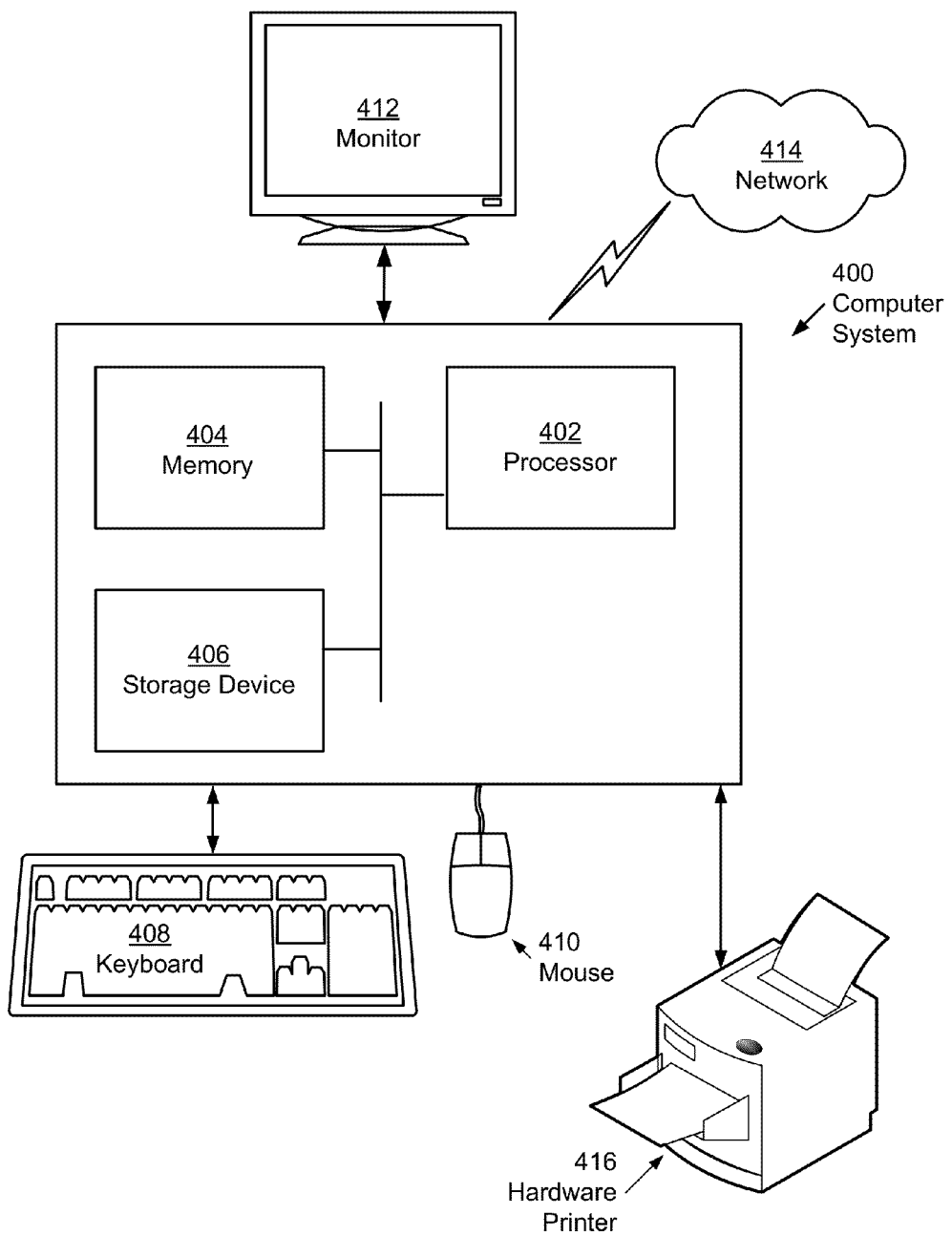
FIG. 7 shows a computer system in accordance with one or more embodiments of the invention.

Embodiments of the invention may be implemented on virtually any type of computer regardless of the platform being used. For example, as shown in FIG. 7, a computer system (400) includes one or more processor(s) (402), such as an integrated circuit, central processing unit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) and hardware printer (416). The input and output means may also be combined, such as an LCD output device with a touch-based input surface. The computer system (400) may be connected to a network (414) (e.g., a local area network (LAN), a wide area network (WAN) such as the Internet, a wireless network, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., application system, file repository, codification system, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored, temporarily or permanently, in whole or in part, on a non-transitory computer readable storage medium such as a compact disc (CD), memory module, a diskette, a tape, a flash device, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for applying pagination, the method comprising:
    receiving a first request to print a first report spanning a plurality of files;
    gathering, in response to the first request, a first plurality of attributes for the first report, wherein the first plurality of attributes comprises at least one document attribute gathered from a financial application and at least one report attribute specifying a filing parameter for the first report;
    selecting, according to the first plurality of attributes, a first plurality of pagination rules, wherein each pagination rule of the first plurality of pagination rules comprises a pagination requirement;
    after receiving the first request, processing each file of the plurality of files by:
        obtaining a document from the file;
        selecting a first pagination rule, corresponding to the document, from the first plurality of pagination rules;
        generating a first modified version of the document by applying the pagination requirement in the first pagination rule to the document; and
        appending the first modified version of the document to the first report; and
    dispatching the first report to a printer.

2. The method of claim 1, wherein, for at least one document, generating the first modified version of the document by applying the pagination requirement in the first pagination rule to the at least one document comprises adding page numbering in accordance with the first pagination rule to the document.

3. The method of claim 1, further comprising:
    after dispatching the first print job, receiving a second request to print a second report spanning the plurality of files;
    gathering, in response to the second request, a second plurality of attributes for the second report;
    selecting, according to the second plurality of attributes, a second plurality of pagination rules;
    after receiving the second request, processing each file of the plurality of files by:
        obtaining the document from the file;
        selecting a second pagination rule, corresponding to the document, from the second plurality of pagination rules;
        generating a second modified version of the document by applying the pagination requirement in the second pagination rule to the document; and
        appending the second modified version of the document to the second report; and
    dispatching the second report to the printer.

4. The method of claim 1, further comprising:
    applying at least one of the first plurality of pagination rules to the plurality of files to generate an ordering of the plurality of files according to the first plurality of pagination rules, wherein the plurality of files are processed according to the ordering.

5. The method of claim 1, wherein generating the first modified version comprises:
    obtaining the pagination requirement of the first pagination rule;
    selecting a second pagination rule, corresponding to the document, from the first plurality of pagination rules;
    obtaining the pagination requirement of the second pagination rule;
    updating a pagination of the document to comply with the pagination requirement of the first pagination rule and the pagination requirement of the second pagination rule; and
    transforming the document with the pagination into a data format required by the printer.

6. The method of claim 1, wherein generating the first modified version further comprises:
    obtaining the pagination requirement of the first pagination rule;
    updating a pagination of the document to comply with the pagination requirement of the first pagination rule;
    selecting a second pagination rule, corresponding to the document, from the first plurality of pagination rules;
    obtaining the pagination requirement of the second pagination rule;
    detecting a conflict between the pagination requirement of the first pagination rule and the pagination requirement of the second pagination rule;
    ignoring the second pagination rule in response to the conflict; and
    transforming the document with the pagination into a data format required by the printer.

7. The method of claim 1, wherein the filing parameter identifies a specific country for filing the first report, and wherein the first plurality of pagination rules comprises a culture rule specifying the pagination requirement of the specific country.

8. The method of claim 1, wherein the filing parameter identifies a specific industry of a business entity filing the first report, and wherein the plurality of pagination rules comprises an industry rule specifying the pagination requirement of the specific industry.

9. The method of claim 1, wherein the filing parameter identifies an accounting standard for filing the first report, and wherein the first plurality of pagination rules comprises an accounting standard rule specifying the pagination requirement of the specific accounting standard.

10. The method of claim 1, the filing parameter identifies a specific business entity filing the first report, and wherein the plurality of pagination rules comprises a business entity rule specifying the pagination requirement of the specific business entity.

11. The method of claim 1, wherein the first plurality of pagination rules comprises a document type rule specifying the pagination requirement for a specific file format.

12. A system for applying pagination, the system comprising:
a computer processor;
a pagination rules repository comprising a plurality of pagination rules;
an application system executing on the computer processor and comprising:
a report generation engine connected to the pagination rules repository and configured to:
receive a request to print a report spanning a plurality of files;
gather, in response to the request, a plurality of attributes for the report, wherein the first plurality of attributes comprises at least one document attribute gathered from a financial application and at least one report attribute specifying a filing parameter for the report;
select, according to the plurality of attributes, a plurality of pagination rules, wherein each pagination rule of the plurality of pagination rules comprises a pagination requirement;
process, after receiving the request, each file of the plurality of files by:
obtaining a document from the file;
selecting a pagination rule, corresponding to the document, from the plurality of pagination rules;
generating a modified version of the document by applying the pagination requirement in the pagination rule to the document; and
appending the modified version of the document to the report; and
dispatch the report to a printer.

13. The system of claim 12, wherein, for at least one document, generating the modified version of the document by applying the pagination requirement in the pagination rule to the at least one document comprises adding page numbering in accordance with the pagination rule to the at least one document.

14. The system of claim 12, further comprising:
a financial application engine configured to generate the document in each of the plurality of files, wherein the report generation engine obtains the document from the financial application engine.

15. The system of claim 12, further comprising:
an office suite application configured to display at least one document in the plurality of files.

16. The system of claim 12, further comprising:
a codification system comprising
a codification engine for managing the plurality of pagination rules; and
a codification interface configured to:
receive, from a user, a new pagination rule; and
store the new pagination rule in the pagination rules repository.

17. The system of claim 16, wherein the codification system further comprises an update manager, wherein the update manager is configured to update the pagination rules repository when new pagination rules exist.

18. The system of claim 12, wherein the filing parameter identifies a specific country for filing the report, and wherein the plurality of pagination rules comprises a culture rule specifying the pagination requirement of the specific country.

19. The system of claim 12, wherein the filing parameter identifies a specific industry of a business entity filing the report, and wherein the plurality of pagination rules comprises an industry rule specifying the pagination requirement of the specific industry.

20. The system of claim 12, wherein the filing parameter identifies an accounting standard for filing the report, and wherein the plurality of pagination rules comprises an accounting standard rule specifying the pagination requirement of the specific accounting standard.

21. The system of claim 12, the filing parameter identifies a specific business entity filing the report, and wherein the plurality of pagination rules comprises a business entity rule specifying the pagination requirement of the specific business entity.

22. The system of claim 12, wherein the plurality of pagination rules comprises a document type rule specifying the pagination requirement for a specific file format.

23. A non-transitory computer readable storage medium comprising computer readable program code embodied therein for causing a computer system to:
receive a first request to print a first report spanning a plurality of files;
gather, in response to the first request, a first plurality of attributes for the first report, wherein the first plurality of attributes comprises at least one document attribute gathered from a financial application and at least one report attribute specifying a filing parameter for the first report;
select, according to the first plurality of attributes, a first plurality of pagination rules, wherein each pagination rule of the first plurality of pagination rules comprises a pagination requirement;
after receiving the first request, process each file of the plurality of files by:
obtaining a document from the file;
selecting a first pagination rule, corresponding to the document, from the first plurality of pagination rules;
generating a first modified version of the document by applying the pagination requirement in the first pagination rule to the document; and
appending the first modified version of the document to the first report; and
dispatch the first report to a printer.

24. The non-transitory computer readable storage medium of claim 23, wherein, for at least one document, generating the first modified version of the document by applying the pagination requirement in the first pagination rule to the at least one document comprises adding page numbering in accordance with the first pagination rule to the document.

25. The non-transitory computer readable storage medium of claim 23, wherein the computer readable program code further cause the computer system to:
after dispatching the first print job, receive a second request to print a second report spanning the plurality of files;
gather, in response to the second request, a second plurality of attributes for the second report;
select, according to the second plurality of attributes, a second plurality of pagination rules;
after receiving the second request, process each file of the plurality of files by:
obtaining the document from the file;
selecting a second pagination rule, corresponding to the document, from the second plurality of pagination rules;
generating a second modified version of the document by applying the pagination requirement in the second pagination rule to the document; and
appending the second modified version of the document to the second report; and
dispatch the second report to the printer.

26. The non-transitory computer readable storage medium of claim 23, wherein the computer readable program code further cause the computer system to:
apply at least one of the first plurality of pagination rules to the plurality of files to generate an ordering of the plurality of files according to the first plurality of pagination rules, wherein the plurality of files are processed according to the ordering.

27. The non-transitory computer readable storage medium of claim 23, wherein generating the first modified version comprises:
obtaining the pagination requirement of the first pagination rule;
selecting a second pagination rule, corresponding to the document, from the first plurality of pagination rules;
obtaining the pagination requirement of the second pagination rule;
updating a pagination of the document to comply with the pagination requirement of the first pagination rule and the pagination requirement of the second pagination rule; and
transforming the document with the pagination into a data format required by the printer.

28. The non-transitory computer readable storage medium of claim 23, wherein generating the first modified version further comprises:
obtaining the pagination requirement of the first pagination rule;
updating a pagination of the document to comply with the pagination requirement of the first pagination rule;
selecting a second pagination rule, corresponding to the document, from the first plurality of pagination rules;
obtaining the pagination requirement of the second pagination rule;
detecting a conflict between the pagination requirement of the first pagination rule and the pagination requirement of the second pagination rule;
ignoring the second pagination rule in response to the conflict; and
transforming the document with the pagination into a data format required by the printer.

29. The non-transitory computer readable storage medium of claim 23, wherein the filing parameter identifies a specific country for filing the first report, and wherein the first plurality of pagination rules comprises a culture rule specifying the pagination requirement of the specific country.

30. The non-transitory computer readable storage medium of claim 23, wherein the filing parameter identifies a specific industry of a business entity filing the first report, and wherein the plurality of pagination rules comprises an industry rule specifying the pagination requirement of the specific industry.

31. The non-transitory computer readable storage medium of claim 23, wherein the filing parameter identifies an accounting standard for filing the first report, and wherein the first plurality of pagination rules comprises an accounting standard rule specifying the pagination requirement of the specific accounting standard.

32. The non-transitory computer readable storage medium of claim 23, the filing parameter identifies a specific business entity filing the first report, and wherein the plurality of pagination rules comprises a business entity rule specifying the pagination requirement of the specific business entity.

33. The non-transitory computer readable storage medium of claim 23, wherein the first plurality of pagination rules comprises a document type rule specifying the pagination requirement for a specific file format.

* * * * *